(12) United States Patent
Kaul (10) Patent No.: US 11,440,203 B2
(45) Date of Patent: Sep. 13, 2022

(54) ROBOTIC TOOL CHANGERS AND METHODS OF USE

(71) Applicant: Toyota Research Institute, Inc., Los Altos, CA (US)

(72) Inventor: Lukas Sebastian Kaul, South San Francisco, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 144 days.

(21) Appl. No.: 17/088,151

(22) Filed: Nov. 3, 2020

(65) Prior Publication Data

US 2022/0072716 A1 Mar. 10, 2022

Related U.S. Application Data

(60) Provisional application No. 63/074,583, filed on Sep. 4, 2020.

(51) Int. Cl.
*B25J 15/00* (2006.01)
*B25J 15/04* (2006.01)
*B25J 19/00* (2006.01)

(52) U.S. Cl.
CPC ....... *B25J 15/0019* (2013.01); *B25J 15/0408* (2013.01); *B25J 19/0025* (2013.01)

(58) Field of Classification Search
CPC ............... B25J 15/0019; B25J 19/0025; B25J 15/0408; B25J 9/08; B25J 9/06; B25J 15/0491; B25J 15/0475; B25J 15/0425
(Continued)

(56) References Cited

U.S. PATENT DOCUMENTS 4,664,588 A * 5/1987 Newell ................ B23Q 1/0063
414/730
4,759,686 A * 7/1988 Kirst ..................... B25J 15/0491
414/744.8
(Continued)

FOREIGN PATENT DOCUMENTS

DE 102010006853 B4 3/2019
KR 100392568 B1 7/2003
(Continued)

OTHER PUBLICATIONS

Ron Berenstein, Averell Wallach, Pelagie Elimbi Moudio, Peter Cuellar, and Ken Goldberg, An Open-Access Passive Modular Tool Changing System for Mobile Manipulation Robots (https://goldberg.berkeley.edu/pubs/CASE2018-ron-tool-changer-submitted.pdf), 7 pages, accessed Jun. 29, 2020.

*Primary Examiner* — Paul T Chin
(74) *Attorney, Agent, or Firm* — Dinsmore & Shohl LLP (57) ABSTRACT

A robotic tool changer is provided including a tool adapter. The tool adapter includes a body having a robot wall, a tool wall, and a side wall extending from the robot wall to the tool wall. A rear opening is formed in the side wall and the tool wall through which a tool element extends to enter a tool hole formed in the body. The tool adapter also includes a locking member movable relative to the body between an open position in which the locking member permits positioning of the tool element into or out of the tool hole through the rear opening, and a closed position in which the locking member prohibits positioning of the tool element into or out of the tool hole through the rear opening.

20 Claims, 8 Drawing Sheets

(58) Field of Classification Search
USPC .................................. 294/106, 213
See application file for complete search history.

(56) References Cited

U.S. PATENT DOCUMENTS

| | | | |
|---|---|---|---|
| 2012/0204674 A1* | 8/2012 | Lundberg | F16H 49/001 74/640 |
| 2012/0207538 A1* | 8/2012 | Rizk | B25J 15/04 901/41 |
| 2016/0059424 A1* | 3/2016 | Zachary | B25J 15/0416 483/1 |
| 2017/0225341 A1* | 8/2017 | Kerestes | B25J 15/0491 |
| 2018/0257221 A1* | 9/2018 | Toothaker | B25J 19/0033 |
| 2020/0061847 A1* | 2/2020 | Dixon | A61B 34/30 |
| 2020/0276719 A1* | 9/2020 | Buind | B25J 15/0019 |

FOREIGN PATENT DOCUMENTS

| | | |
|---|---|---|
| KR | 101786752 B1 | 10/2017 |
| KR | 20190141692 A | 12/2019 |
| KR | 20200055019 A | 5/2020 |
| WO | 2018236488 A1 | 12/2018 |

* cited by examiner

ROBOTIC TOOL CHANGERS AND METHODS OF USE

CROSS-REFERENCE TO RELATED APPLICATION

This application claims priority to U.S. Provisional Patent Application No. 63/074,583, filed Sep. 4, 2020, for "ROBOTIC TOOL CHANGERS AND METHODS OF USE," which is hereby incorporated by reference in its entirety including the drawings.

TECHNICAL FIELD

The present specification generally relates to robotic tool changers for attaching different tools to a robotic device and, more specifically, robotic tool changers including a rotatable locking mechanism for preventing removal of a tool from the robotic tool changer.

BACKGROUND

In-home mobile manipulation robots typically include a wheeled mobile base, at least one robotic arm with multiple degrees of freedom, and an end-effector, such as a tool, provided at an end of the robotic arm. The tool may be any suitable device such as, for example, a gripper, a vacuum device, a cleaning sponge, a duster, or the like specialized for a specific task. To expand the capabilities of the robot, the robot needs to be able to quickly swap or change the tool for the particular job being performed. The robot needs to do this without human intervention. Commercial in-home robots typically move with far less accuracy than industrial robots, for example, welding robots used in vehicle manufacturing.

Accordingly, a need exists for improved robotic tool changers that can be used to mount various tools to a robot despite having reduced accuracy during movement and operation as compared to industrial robots.

SUMMARY

In one embodiment, a tool adapter includes a body having a robot wall, a tool wall, and a side wall extending from the robot wall to the tool wall. A rear opening is formed in the side wall and the tool wall through which a tool element extends to enter a tool hole formed in the body. The tool adapter also includes a locking member movable relative to the body between an open position in which the locking member permits positioning of the tool element into or out of the tool hole through the rear opening, and a closed position in which the locking member prohibits positioning of the tool element into or out of the tool hole through the rear opening.

In another embodiment, robotic tool changer includes a tool adapter and a tool element. The tool adapter includes a body having a robot wall, a tool wall, and a side wall extending from the robot wall and the tool wall. A rear opening is formed in the side wall and the tool wall. The tool adapter also includes a locking member movable relative to the body between an open position and a closed position. The tool element includes a base attachable to a tool, and a head coupled to the base. The head of the tool element is insertable through the rear opening of the body of the tool adapter and into a tool hole of the tool adapter. When the locking member is in the open position, positioning of the head of the tool element through the rear opening of the body is permitted. When the locking member is in the closed position, positioning of the head of the tool element through the rear opening of the body is not permitted.

In yet another embodiment, a method includes rotating a locking member of a tool adapter coupled to a robotic arm in a first direction from a closed position to an open position to provide access to a tool hole of the tool adapter through a rear opening of the tool adapter. A tool element coupled to a tool is inserted through the rear opening of the tool adapter and into the tool hole of the tool adapter. The locking member is rotated in an opposite second direction from the open position toward the closed position to prevent removal of the tool element out of the tool hole of the tool adapter through the rear opening.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to robotic tool changers for attaching a variety of tools to a robotic device such as, for example, a robotic arm. The robotic tool changers include a tool adapter, mounted to an end of the robotic device, configured to receive and lock a tool element in position within the tool adapter. The tool element is mounted to a corresponding tool for coupling the tool to the robotic device.

The tool adapter includes a body having a robot wall, a tool wall, and a side wall extending from the robot wall to the tool wall. A rear opening is formed in the side wall and the tool wall through which the tool element extends to enter a tool hole formed in the body. The tool adapter also includes a locking member movable relative to the body between an open position in which the locking member permits positioning of the tool element into or out of the tool hole through the rear opening, and a closed position in which the locking member prohibits positioning of the tool element into or out of the tool hole through the rear opening. The geometry of the rear opening in the tool adapter corresponding to the geometry of the tool element provides a reduced risk of engagement failure between the tool adapter and the tool element. Additionally, the locking member facilitates engagement and disengagement of the tool element within the tool adapter as the locking member rotates between the open position and the closed position. Various embodiments of the robotic tool changers and the operation of the robotic tool changers are described in more detail herein. Whenever possible, the same reference numerals will be used throughout the drawings to refer to the same or like parts.

Figure 1:
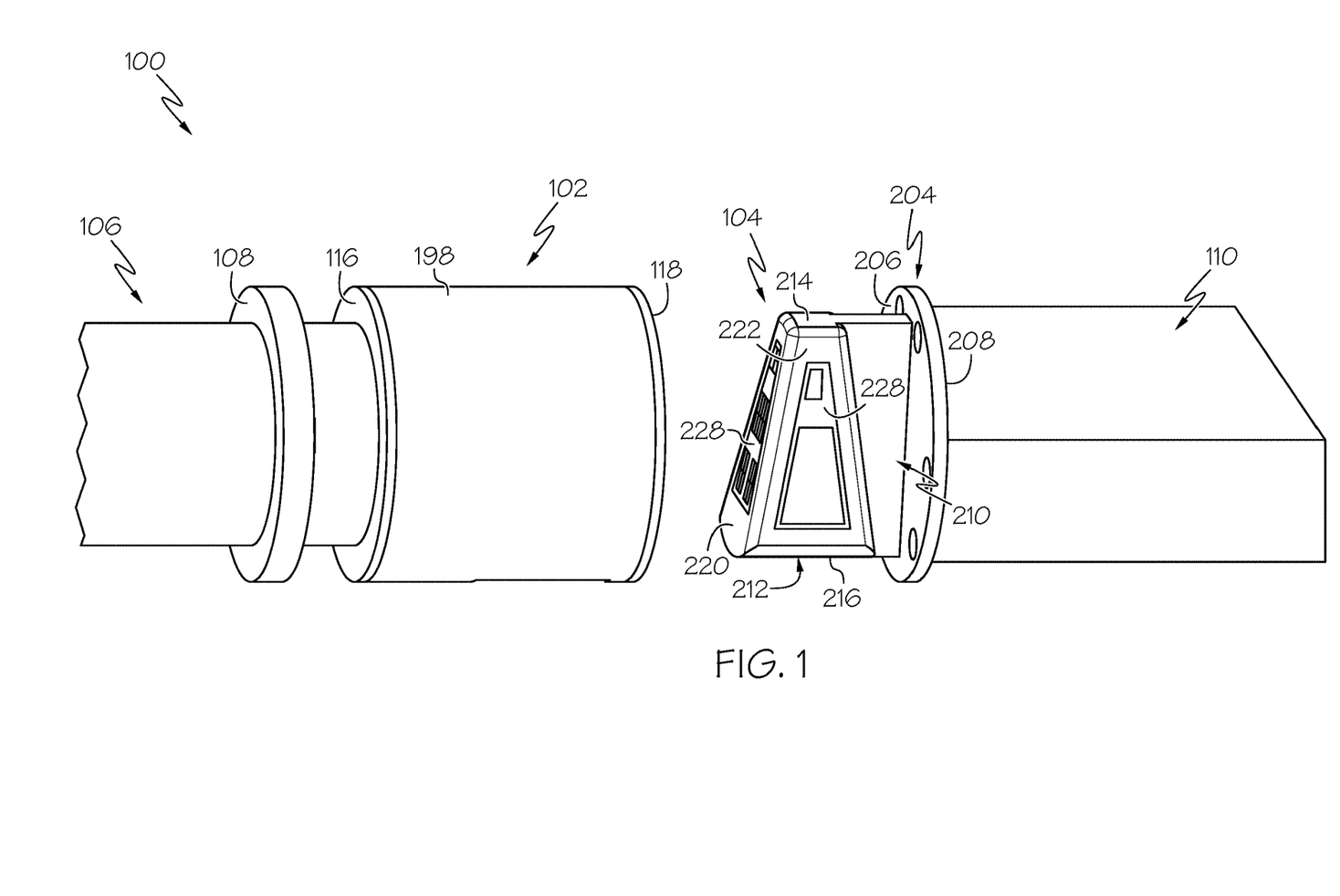
FIG. 1 schematically depicts a perspective view of a tool adapter mounted to a robotic device and a tool element mounted to a tool in a non-engaged position, according to one or more embodiments shown and described herein.

Referring now to FIG. 1, a robotic tool changer 100 is shown including a tool adapter 102 and a tool element 104. The tool adapter 102 is coupled to any suitable robotic device configured to utilize a variety of tools. As shown herein, the tool adapter 102 is mounted to a robotic arm 106 of a robotic device having a tool end 108 at which the tool adapter 102 is mounted. However, it should be appreciated that the robotic device may include any other robotic manipulation device to which the tool adapter 102 is mounted other than the robotic arm 106. Although not shown, the tool adapter 102 is electrically connected to a power supply for providing power to the tool adapter 102 and is electrically connected to an electronic control unit for providing operating instructions to the tool adapter 102 such as, for example, locking and unlocking operations for securing the tool element 104 thereto, as described in more detail herein. The tool adapter 102 may be electrically connected to the power supply and the electronic control unit directly or indirectly via the robotic arm 106. Further, as described herein, the tool adapter 102 may communicate with the robotic arm 106 to automatically adjust a position of the robotic arm 106 when engaging a tool.

As shown, the tool element 104 is fixed to a tool 110 such as, for example, a gripping device, vacuum device, a cleaning device, or the like. The present disclosure is not limited to any particular tool in which the tool element 104 may be attached. As described herein, either the robotic arm 106 moves the tool adapter 102 relative to the tool element 104, or the tool 110 is moved relative to the robotic arm 106 such that the tool element 104 is received within the tool adapter 102. Once the tool element 104 is received within the tool adapter 102, the tool adapter 102 is instructed to lock the tool element 104 within the tool adapter 102 for preventing the removal of the tool element 104 unless otherwise instructed.

Figure 2:
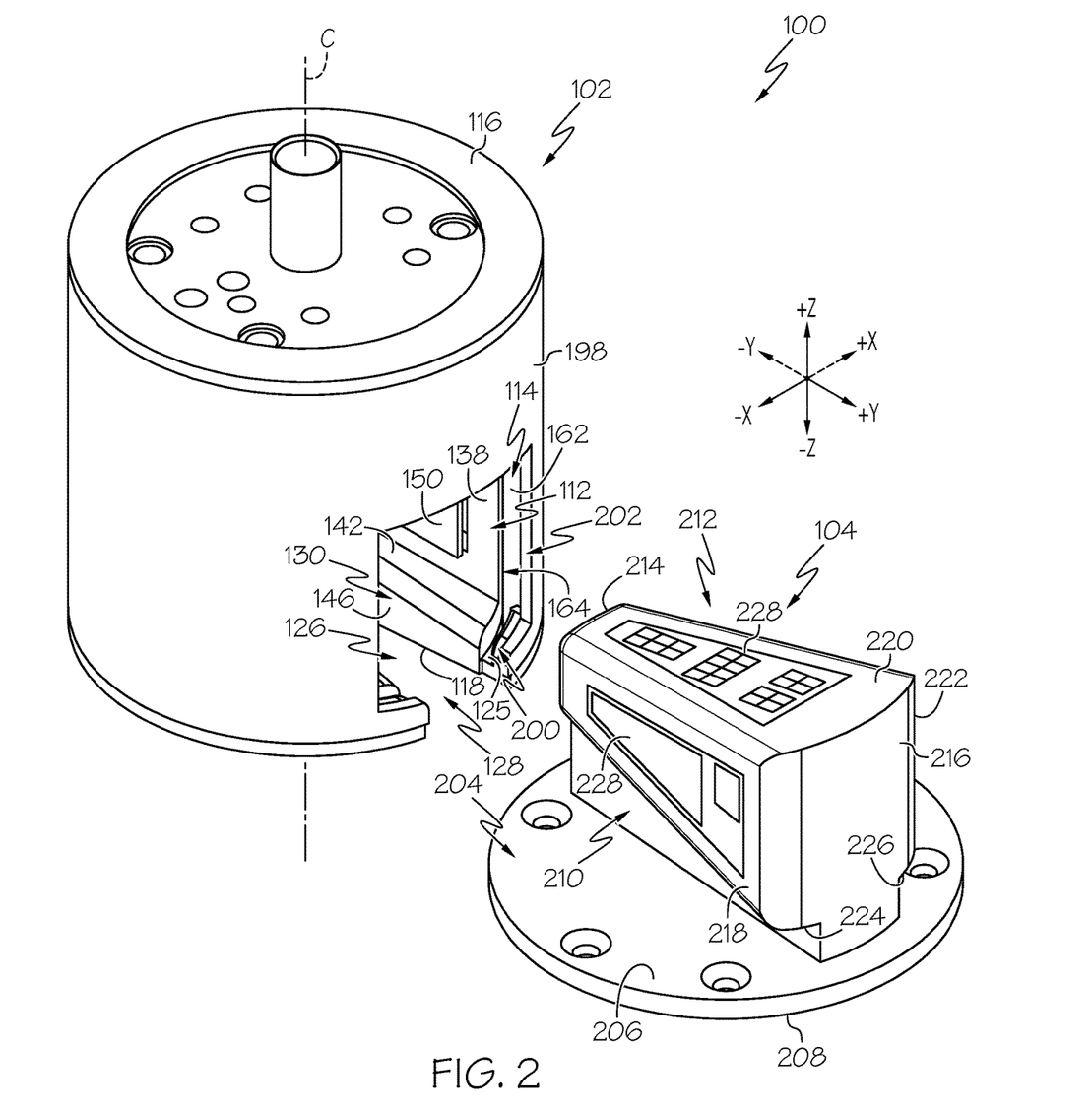
FIG. 2 schematically depicts a perspective view of the tool adapter and the tool element in the non-engaged position and in the unlocked state, according to one or more embodiments shown and described herein.
Figure 3:
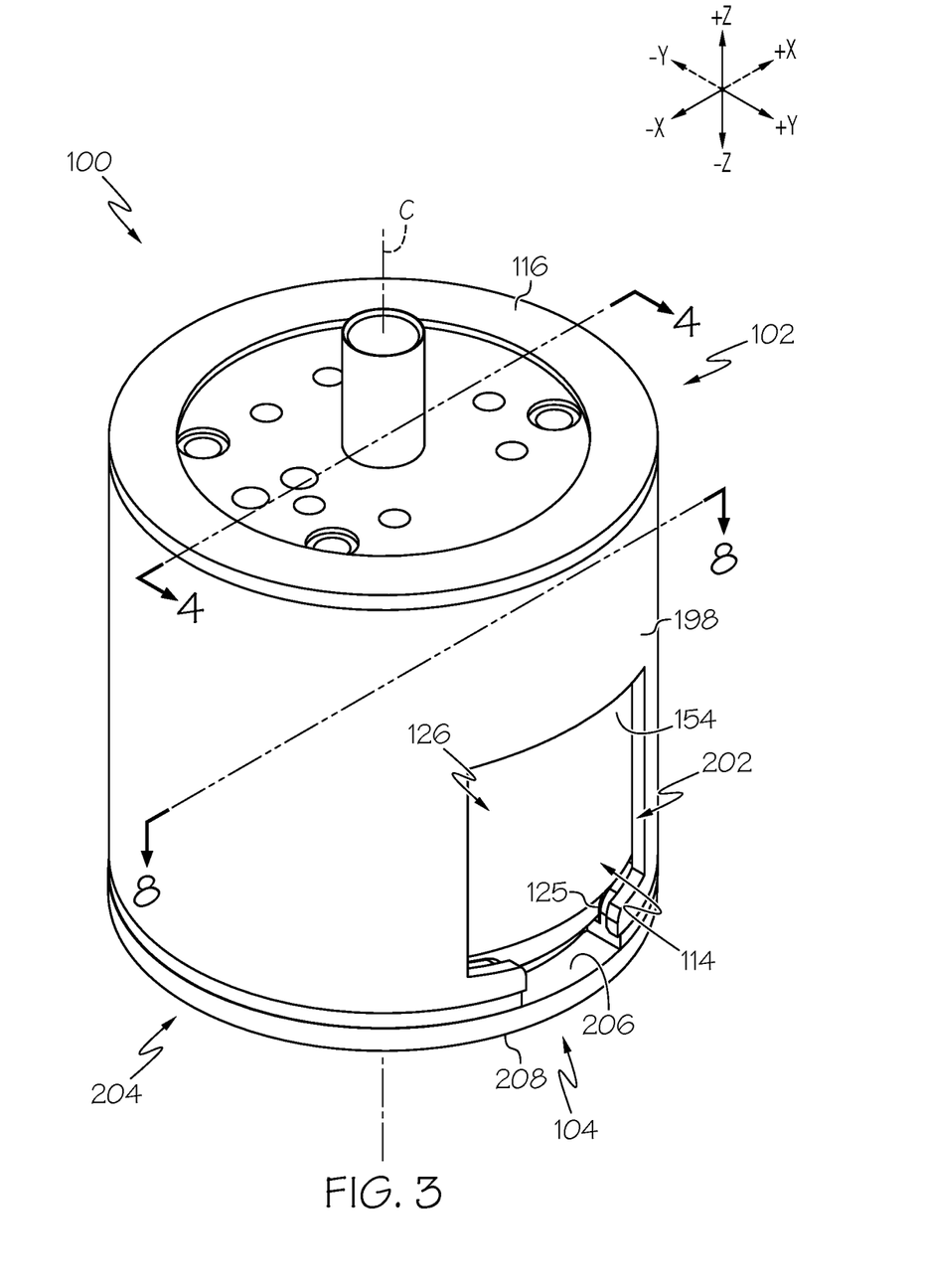
FIG. 3 schematically depicts a perspective view of the tool adapter and the tool element in a fully engaged position and in the locked state, according to one or more embodiments shown and described herein.

As described in more detail herein, the tool element 104 may be positionable between a non-engaged position, a partially engaged position, and a fully engaged position relative to the tool adapter 102. Further, the tool adapter 102 is positionable between a locked state and an unlocked state. When the tool element 104 is in in the fully engaged position within the tool adapter 102 and the tool adapter 102 is in the locked state, the tool element 104 is not permitted to be removed. The tool element 104 is only permitted to be removed from the tool adapter 102 once the tool adapter 102 is transitioned into the unlocked state and the tool element 104 is moved to the partially engaged position within the tool adapter 102. Thereafter, the tool element 104 may be removed from the tool adapter 102 and positioned in the non-engaged position. As shown in FIG. 2, the tool element 104 is in the non-engaged position as the tool element 104 is not inserted into the tool adapter 102. Further, the tool adapter 102 is in the unlocked state in which the tool element 104 is permitted to be inserted into the tool adapter 102. As shown in FIG. 3, the tool element 104 is in the fully engaged position within the tool adapter 102 and the tool adapter 102 is in the locked state, thus preventing removal of the tool element 104 from the tool adapter 102. The interaction between the tool element 104 and the tool adapter 102 during the different positions of the tool element 104, as well as the different states of the tool adapter 102 will be described in more detail herein.

Figure 4:
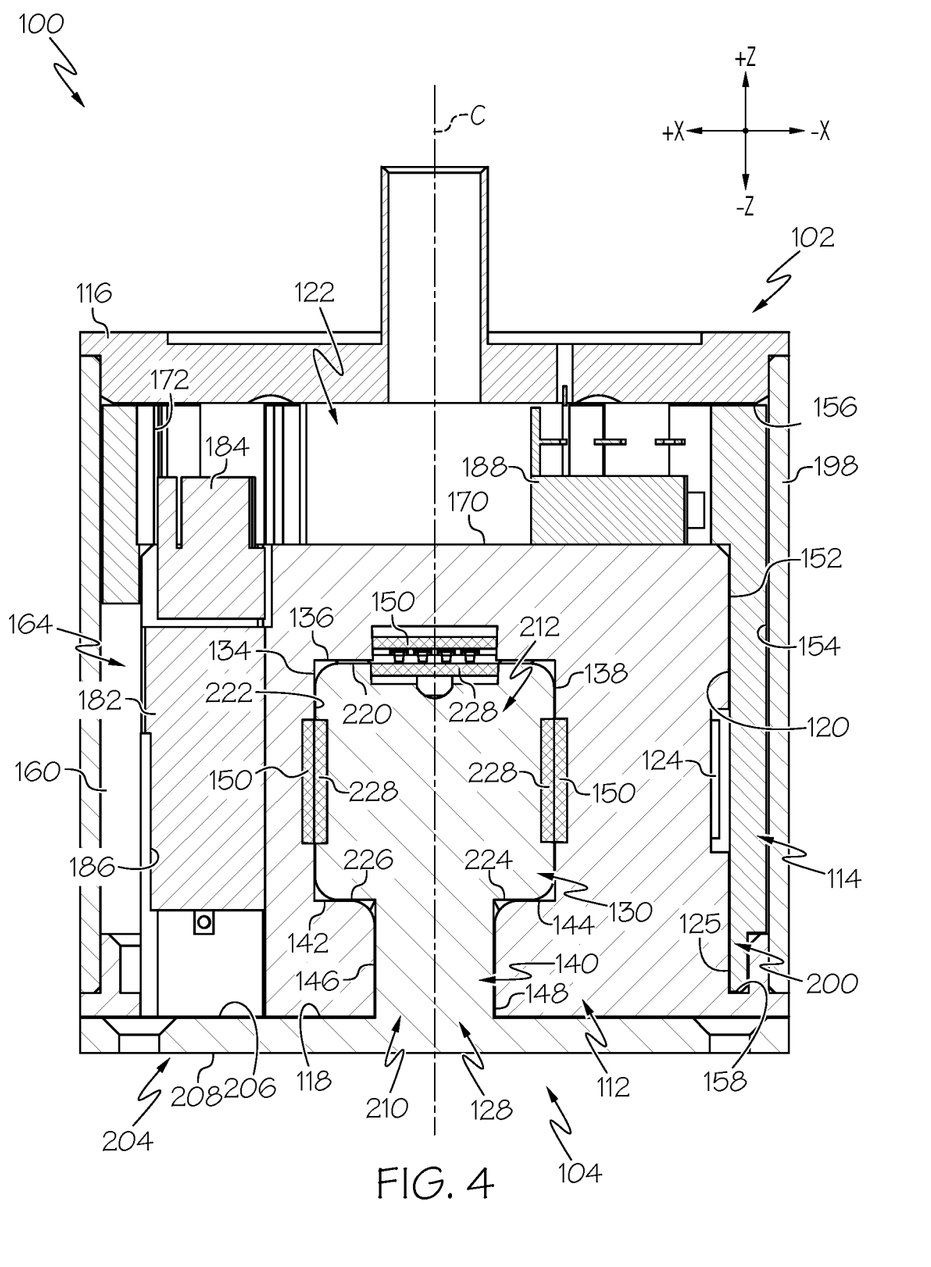
FIG. 4 schematically depicts a cross-sectional view of the tool adapter and the tool element in the fully engaged position taken along line 4-4 of FIG. 3, according to one or more embodiments shown and described herein.

As shown in FIGS. 2 and 4, the tool adapter 102 generally includes a body 112 and a locking member 114 positionable between an open position and a closed position relative to the body 112. The body 112 has a robot wall 116, an opposite tool wall 118, and a side wall 120 extending from the robot wall 116 to the tool wall 118. The robot wall 116 may be configured to mount the tool adapter 102 to the robotic arm 106 using any suitable fastener or locking mechanism such as, for example, threaded fasteners, clamps, or the like for fixing the tool adapter thereto. The robot wall 116 may have any suitable structure for engaging the robotic arm 106 and permitting the tool adapter 102 to be electronically connected to the robotic arm 106 or directly connected to the power supply and the electronic control unit. In some embodiments, the body 112 may be a one-piece, monolithic structure. In other embodiments, the body 112 may include removable portions and walls such that internal components of the tool adapter 102 may be accessed. For example, the robot wall 116 may be removable from the side wall 120 of the body 112 to permit access to an enclosure 122 of the body 112 in which various internal components of the tool adapter 102 are provided. The side wall 120 of the body 112 may have an indentation 124 formed therein for receiving a portion of the locking member 114 during rotation of the locking member 114 between the open position and the closed position. The tool wall 118 may have a channel 125 extending along a perimeter of the body 112 for receiving an end of the locking member 114 and guiding rotation thereof.

The body 112 of the tool adapter 102 includes a rear opening 126 formed in the side wall 120 and a bottom opening 128 formed in the tool wall 118 of the body 112. The rear opening 126 and the bottom opening 128 are continuous to allow the tool element 104 to extend therethrough to enter a tool hole 130 formed in the body 112. The body 112 also has a front opening 132 formed in the side wall 120 of the body 112 opposite the rear opening 126 to allow a portion of the locking member 114 to extend into the tool hole 130, as described in more detail herein. The tool hole 130 is defined by at least one interior surface. As shown, the tool hole 130 is defined by at least a first interior surface 134, a second interior surface 136, and a third interior surface 138 that are each tapered inwardly toward one another from the rear opening 126 of the side wall 120 of the body 112 toward the front opening 132 of the side wall 120 of the body 112. Thus, the tool hole 130 has a substantially pyramidal shape. In addition, the body 112 has a passageway 140 extending from the bottom opening 128 to the tool hole 130. The passageway 140 has a width that is less than a width of the tool hole 130. Thus, the tool hole 130 is further defined by a pair of ledges 142, 144 extending opposite the second interior surface 136 and also tapering inwardly from the rear opening 126 toward the front opening 132. The pair of ledges 142, 144 extend toward one another perpendicular to the first interior surface 134 and the third interior surface 138, respectively, and terminate at a pair of vertical walls 146, 148. The vertical walls 146, 148 each extend between the pair of ledges 142, 144 and the tool wall 118 of the body 112 at the bottom opening 128 to define the passageway 140.

The body 112 of the tool adapter 102 may include a plurality of electrical contacts 150 provided on at least one of the first interior surface 134, the second interior surface 136, and the third interior surface 138 of the body 112. As shown, the first interior surface 134, the second interior surface 136, and the third interior surface 138 of the body 112 each includes electrical contacts 150 provided thereon facing the tool hole 130. In some embodiments, at least some of the electrical contacts 150 may be spring-loaded. The electrical contacts 150 may be suitable for transmitting power to the tool element 104 and, thus, to the tool 110 from the power supply. The electrical contracts 150 may also be suitable for controlling the tool 110 and receiving sensor data from the tool 110.

As noted above, the tool adapter 102 also includes a locking member 114 rotatable relative to the body 112 about a central rotation axis C extending in the +/−Z direction of the coordinate axes depicted in the drawings. The central rotation axis C is coaxial with a central axis extending through the body 112 of the tool adapter 102. The locking member 114 has a substantially cylindrical geometry and is rotatable around an outside of the side wall 120 of the body 112. As shown in FIG. 4, the locking member 114 has an inner surface 152 and an outer surface 154. The locking member 114 also has an upper end 156, a lower end 158, a first edge 160, and a second edge 162. The first edge 160 and the second edge 162 extend between the upper end 156 and the lower end 158 of the locking member 114 and define an opening 164 formed therein.

When the locking member 114 is rotated such that the opening 164 formed in the locking member 114 overlaps the rear opening 126 formed in the body 112, the locking member 114 is in the open position and the tool adapter 102 is in the unlocked state, thereby permitting the tool element 104 to be received within the tool hole 130 of the tool adapter 102. Alternatively, when the locking member 114 is rotated such that the opening 164 formed in the locking member 114 does not overlap the rear opening 126 formed in the body 112, the locking member 114 is in the closed position and the tool adapter 102 is in the locked state.

In some embodiments, a distance between the first edge 160 and the second edge 162 of the locking member 114, which defines a width of the opening 164 of the locking member 114, is at least as wide as a width of the rear opening 126 formed in the body 112 of the tool adapter 102 to permit the tool element 104 to enter the tool hole 130 when the locking member 114 is in the open position.

Although the locking member 114 is shown covering the entire rear opening 126 of the body 112 when the locking member 114 is in the closed position, as shown in FIG. 3, it should be appreciated that, in some embodiments, only a portion of the rear opening 126 of the body 112 may be covered by the locking member 114 when in the closed position and still prevent removal of the tool element 104 from the tool hole 130 of the tool adapter 102.

Figure 6:
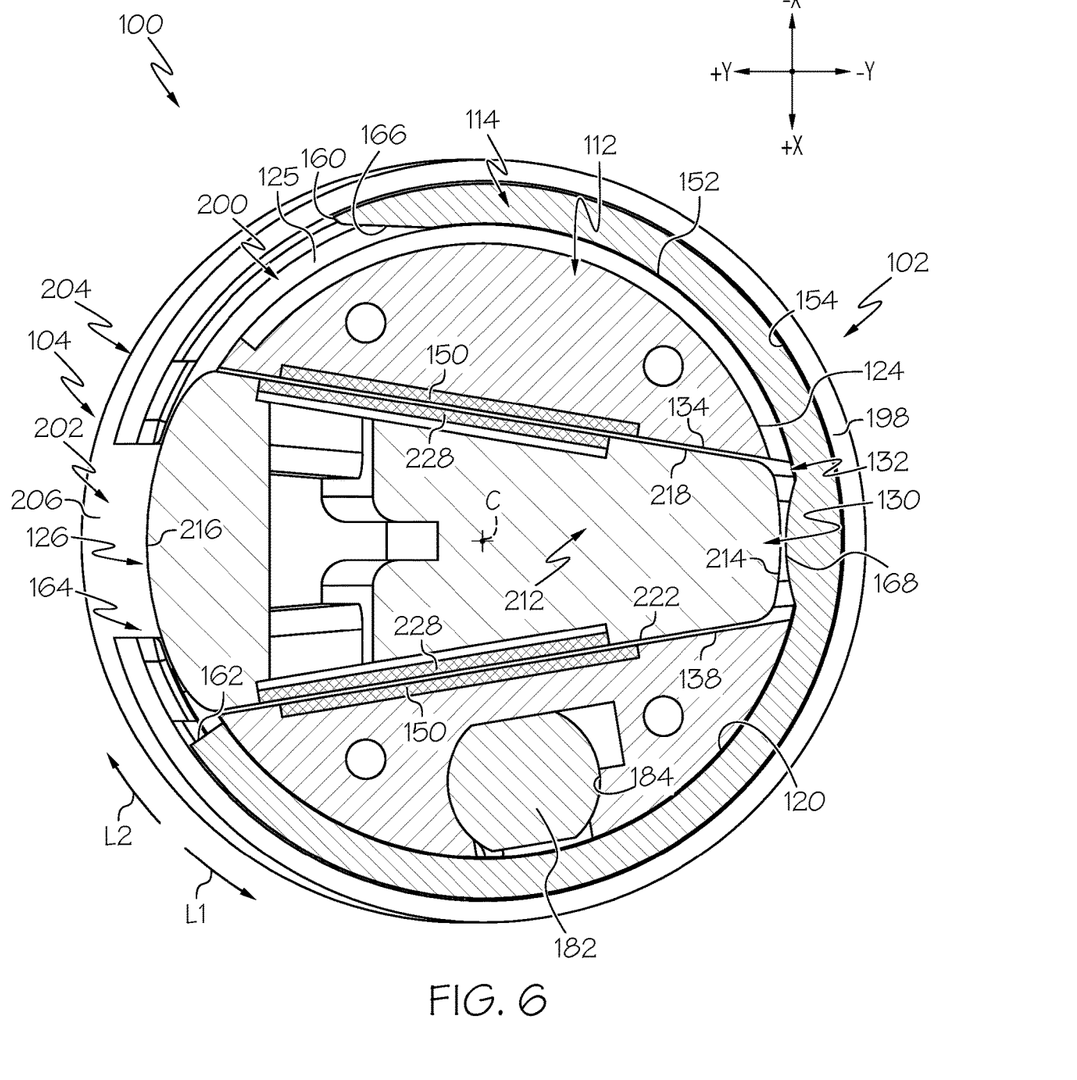
FIG. 6 schematically depicts a cross-sectional top view of the tool adapter and the tool element in a partially engaged position and the unlocked state, according to one or more embodiments shown and described herein.

Referring now to FIG. 6, the locking member 114 may include a plurality of features for engaging the tool element 104 when positioned within the tool hole 130 of the tool adapter 102 for positioning the tool element 104 between the partially engaged position and the fully engaged position. In some embodiments, the first edge 160 of the locking member 114 has a cam 166 formed on the inner surface 152 of the locking member 114. As the locking member 114 rotates in a first direction L1 toward the closed position, the cam 166 on the first edge 160 of the locking member 114 contacts the tool element 104 when in the partially engaged position and pushes the tool element 104 into the fully engaged position. In some embodiments, the locking member 114 includes a dome 168 formed on the inner surface 152 of the locking member 114 and extending radially inwardly toward the tool hole 130. When the locking member 114 is in the open position, the dome 168 extends through the front opening 132 of the body 112 to contact a portion of the tool element 104 when positioned within the tool hole 130. The dome 168 contacting the tool element 104 prevents the tool element 104 from moving into the fully engaged position and being positioned completely within the tool hole 130 until the locking member 114 moves the dome 168 out of contact with the tool element 104. In addition, as described in more detail herein, the dome 168 is configured to eject the tool element 104 from the tool hole 130.

Figure 5:
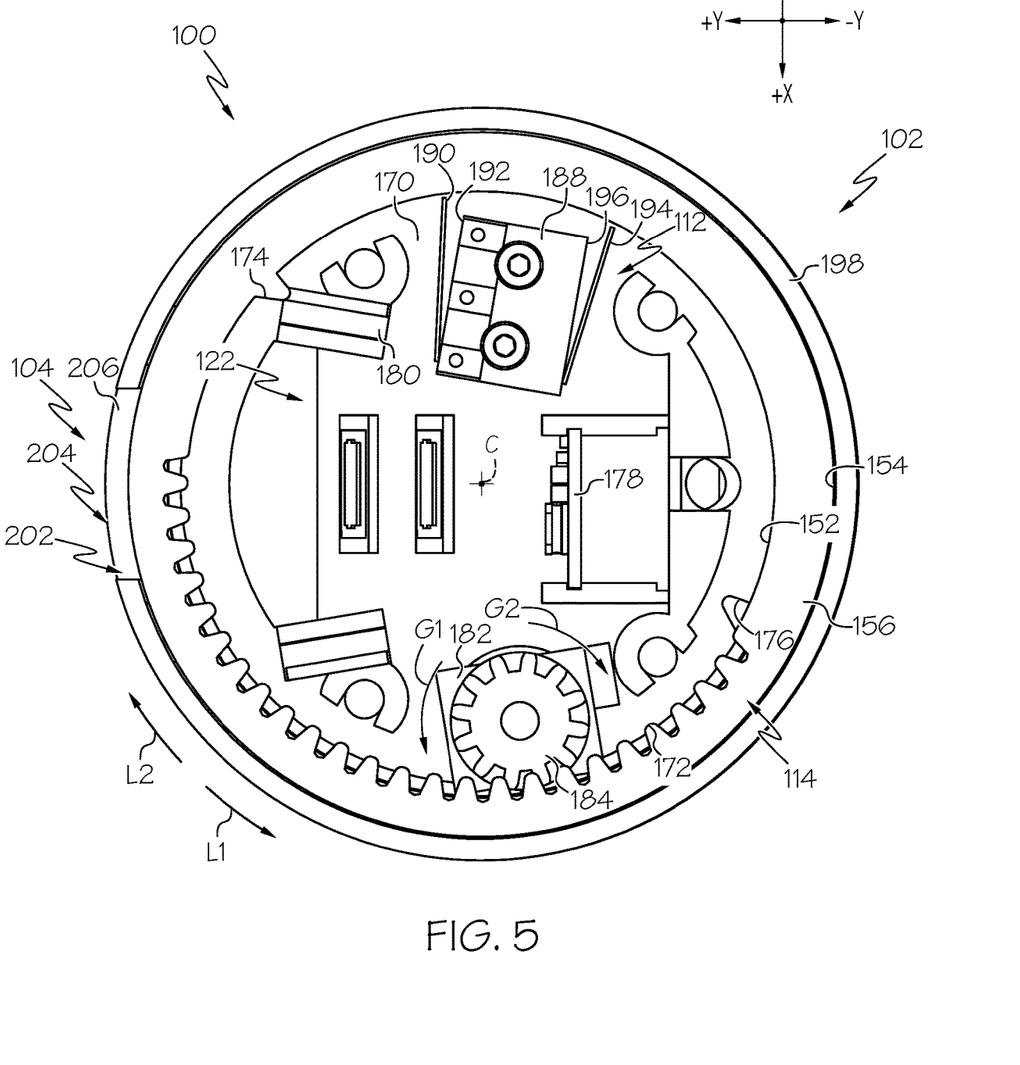
FIG. 5 schematically depicts a partial top view of the tool adapter, according to one or more embodiments shown and described herein.

Referring to FIG. 5, a portion of the locking member 114 and various electronic components are shown within the enclosure 122 of the body 112 defined by a partition wall 170 positioned below the robot wall 116. The locking member 114 has a plurality of teeth 172 provided on the inner surface 152 thereof proximate the upper end 156 of the locking member 114. The teeth 172 extend in a radial direction toward the central rotation axis C along at least a portion of the upper end 156 of the locking member 114. In some embodiments, the locking member 114 includes a first nub 174 and a second nub 176 extending from the inner surface 152 of the locking member 114 in a radial direction into the enclosure 122. The first nub 174 and the second nub 176 are spaced apart from one another at a predetermined distance defining rotation limits of the locking member 114, as discussed in more detail herein.

In some embodiments, within the enclosure 122 of the body 112, between the robot wall 116 and the partition wall 170, the tool adapter 102 includes at least one circuit board 178 provided on the partition wall 170 for electrically communicating with the internal electrical components of the tool adapter 102, such as the electrical contacts 150 of the tool adapter 102, and electrically connecting the internal electrical components to the electronic control unit. As such, at least one aperture 180 is provided in the partition wall 170 for providing access to the electrical contacts 150 within the tool hole 130 from the enclosure 122. A motor 182 is provided in electrical communication with the circuit board 178 for operating a pinion gear 184 rotatably mounted on top of the partition wall 170. The motor 182 may extend through a bore 186 formed in the body 112. The pinion gear 184 is configured to engage the plurality of teeth 172 of the locking member 114 such that rotation of the pinion gear 184 in a first direction G1 by the motor 182 causes the locking member 114 to rotate in the first direction L1 toward the closed position. Similarly, rotation of the pinion gear 184 in an opposite second direction G2 by the motor 182 causes the locking member 114 to rotate in an opposite second direction L2 toward the open position.

The tool adapter 102 also includes a switch device 188 provided on the partition wall 170 in electrical communication with the circuit board 178 for detecting when the locking member 114 reaches the open position and the closed position, and transmitting a signal to deactivate the motor 182. Specifically, the switch device 188 includes a first switch 190 located on a first side 192 of the switch device 188 for detecting that the locking member 114 is in the open position upon contact by the first nub 174, and a second switch 194 for detecting that the locking member 114 is in the closed position upon contact by the second nub 176.

In some embodiments, tool adapter 102 includes a casing 198 surrounding the body 112 of the tool adapter 102 and extending between the robot wall 116 and the tool wall 118 of the body 112. When the casing 198 is provided, a space 200 is defined between the casing 198 and the body 112, and the locking member 114 is positioned within the space 200. Thus, the casing 198 is capable of protecting the locking member 114 from external damage in instances in which the tool adapter 102 is contacted by some external component. Additionally, the casing 198 prevents external objects from contacting the locking member 114 itself, which may prevent the locking member 114 from rotating toward the closed position or the open position. In some embodiments, the casing 198 has a substantially cylindrical geometry similar to that of the locking member 114.

The casing 198 has a window 202 aligned with the rear opening 126 of the body 112 such that the tool element 104 passes through the window 202 of the casing 198 and the rear opening 126 of the body 112 when being positioned into the partially engaged position within the tool adapter 102. The window 202 of the casing 198 may have a width at least equal to the width of the rear opening 126 of the body 112. In other embodiments, the window 202 may have a width that is less than the width of the rear opening 126 of the body 112. However, the width of the window 202 must be at least as large as the tool element 104 to permit the tool element 104 to extend through the rear opening 126 of the body 112 and into the tool hole 130 of the tool adapter 102.

With respect now to the tool element 104, as shown in FIG. 2, the tool element 104 is illustrated in the non-engaged position apart from the tool adapter 102. The tool element 104 generally includes a base 204 having a robot surface 206 and a tool surface 208, a recessed portion 210 extending from the robot surface 206, and a head 212 extending from the recessed portion 210 opposite the base 204. The base 204 of the tool element 104 may be mounted to any suitable tool, such as the tool 110 depicted in FIG. 1, using any suitable fastener or locking mechanism such as, for example, threaded fasteners, clamps, or the like for fixing the tool element 104 thereto. The head 212 of the tool element 104 has a nose end 214, an opposite rear end 216, and at least one side surface extending between the nose end 214 and the rear end 216. As shown, the tool element 104 has a first side surface 218, a second side surface 220, and a third side surface 222 tapering inwardly from the rear end 216 toward the nose end 214. As such, a width of each of the first side surface 218, the second side surface 220, and the third side surface 222 is greater proximate the rear end 216 of the head 212 than a width proximate the nose end 214 of the head 212. Further, a width of the recessed portion 210 between the head 212 and the base 204 proximate the rear end 216 of the head 212 is less than a distance proximate the nose end 214 of the head 212. The head 212 also has a pair of step surfaces 224, 226 extending from the first side surface 218 and the third side surface 222, respectively, toward the recessed portion 210. Thus, the first side surface 218, the second side surface 220, the third side surface 222, and the pair of step surfaces 224, 226 provide a pyramidal geometry corresponding to the pyramidal geometry of the tool hole 130 of the body 112.

The tool element 104 includes a plurality of electrical contacts 228 provided on at least one of the first side surface 218, the second side surface 220, and the third side surface 222 of the tool element 104 to engage respective electrical contacts 150 of the tool adapter 102 when positioned within the tool hole 130 and in the fully engaged position. As shown in FIGS. 2 and 4, the first side surface 218, the second side surface 220, and the third side surface 222 of the tool element 104 each includes electrical contacts 228 provided thereon. In some embodiments, at least some of the electrical contacts 228 may be spring-loaded. The electrical contacts 228 may be suitable for receiving power from the tool adapter 102 and, thus, transmitting power to the tool 110 from the power supply. The electrical contracts 228 may also be suitable for controlling the tool 110 and receiving sensor data from the tool 110. To ensure that the electrical contacts 228 of the tool element 104 engage the electrical contacts 150 of the tool adapter 102 when the tool element 104 is positioned within the tool hole 130, the geometry of the head 212 is such that it matches the geometry of the tool hole 130 of the body 112.

Operation of the robotic tool changer 100 will now be described in more detail. Initially, as shown in FIG. 2, the tool element 104 is not inserted within the tool hole 130 of the tool adapter 102, i.e., in the non-engaged position. To secure the tool element 104 to the tool adapter 102, the locking member 114 of the tool adapter 102 is positioned into the open position such that the rear opening 126 of the body 112 permits the tool element 104 to extend therethrough. Thereafter, either one or both of the tool adapter 102 and the tool element 104 are moved toward one another. This may be done by positioning the tool adapter 102 via the robotic arm 106 and/or by positioning the tool element 104 relative to the tool adapter 102 by some other mechanical positioning mechanism. When positioning the tool element 104 into the tool hole 130 of the tool adapter 102, the nose end 214 of the tool element 104 is directed into the tool hole 130 of the body 112 such that the head 212 of the tool element 104 extends through the rear opening 126 of the body 112 and the recessed portion 210 of the tool element 104 extends through the bottom opening 128 of the body 112.

It should be appreciated that the size of the nose end 214 of the head 212 of the tool element 104 is smaller than the rear opening 126 of the tool adapter 102. This provides for greater range of initial positioning in which the tool element 104 may be inserted through the rear opening 126 of the tool adapter 102. In some embodiments, the position of the tool adapter 102 and/or the tool element 104 may be adjusted during insertion of the tool element 104 within the tool adapter 102 to align the tool element 104 with the tool hole 130 of the tool adapter 102.

As a non-limiting example, in some embodiments, at least one of the tool adapter 102 and the tool element 104 may be freely movable such that when the tool element 104 is inserted into the tool adapter 102, but misaligned with the tool hole 130, the position of the tool adapter 102 and/or the tool element 104 may be passively adjusted as the tool element 104 enters the tool hole 130 and contacts the tool adapter 102 to align the tool element 104 within the tool hole 130. As another non-limiting example, in some embodiments, the robotic arm 106 may include any suitable force detection device and/or torque detection device (not shown) to detect a misalignment between the tool adapter 102 and the tool element 104 as the tool element 104 is inserted into the tool adapter 102. In response to a detected force or torque at the robotic arm 106, a position of the robotic arm 106 may be automatically adjusted to align the tool element 104 with the tool adapter 102 and, more particularly, the tool hole 130. This may be done by controlling the mechanical positioning mechanism controlling the movement of the robotic arm 106 and/or the tool element 104 such that the detected force or torque is eliminated.

As shown in FIG. 6, with reference to FIGS. 4 and 5, the locking member 114 is positioned in the open position and, thus, the tool adapter 102 is in the unlocked state, such that the opening 164 of the locking member 114 overlaps the rear opening 126 of the body 112 of the tool adapter 102 to permit the tool element 104 to be inserted therein. As shown, the tool element 104 is positioned in the partially engaged position within the tool hole 130 of the tool adapter 102. When in the partially engaged position, the head 212 of the tool element 104 is positioned within the tool hole 130 of the tool adapter 102, the recessed portion 210 of the tool element 104 is positioned within the passageway 140 of the tool adapter 102, and the robot surface 206 of the base 204 of the tool element 104 abuts against the tool wall 118 of the body 112 of the tool adapter 102. Due to the recessed portion 210 of the tool element 104 having a width less than a width of the head 212 of the tool element 104, the tool element 104 is not permitted to be removed from the tool hole 130 in the −Z direction of the coordinate axes depicted in the drawings. Instead, the pair of step surfaces 224, 226 of the tool element 104 abut against the pair of ledges 142, 144 of the body 112 of the tool adapter 102 to facilitate guiding the tool element 104 into the tool hole 130.

It should be appreciated that, when in the unlocked state, the first nub 174 contacts the first switch 190 of the switch device 188 to deactivate the motor 182, which controls the pinion gear 184. In the partially engaged position, the dome 168 of the locking member 114 contacts the nose end 214 of the tool element 104 to prevent the tool element 104 from moving into the fully engaged position within the tool hole 130. Further, when in the partially engaged position, the electrical contacts 150 of the tool adapter 102 may not be fully engaged with the electrical contacts 228 of the tool element 104. As shown in FIG. 6, the electrical contacts 150 of the tool adapter 102 are misaligned with the electrical contacts 228 of the tool element 104. Thus, power transfer and communication between the tool adapter 102 and the tool element 104 when in the partially engaged position may not be provided. However, the electrical contacts 150 of the tool adapter 102 and the electrical contacts 228 of the tool element 104 may be partially engaged such that at least the tool adapter 102 may be capable of detecting that the tool element 104 is in the partially engaged position.

Figure 7:
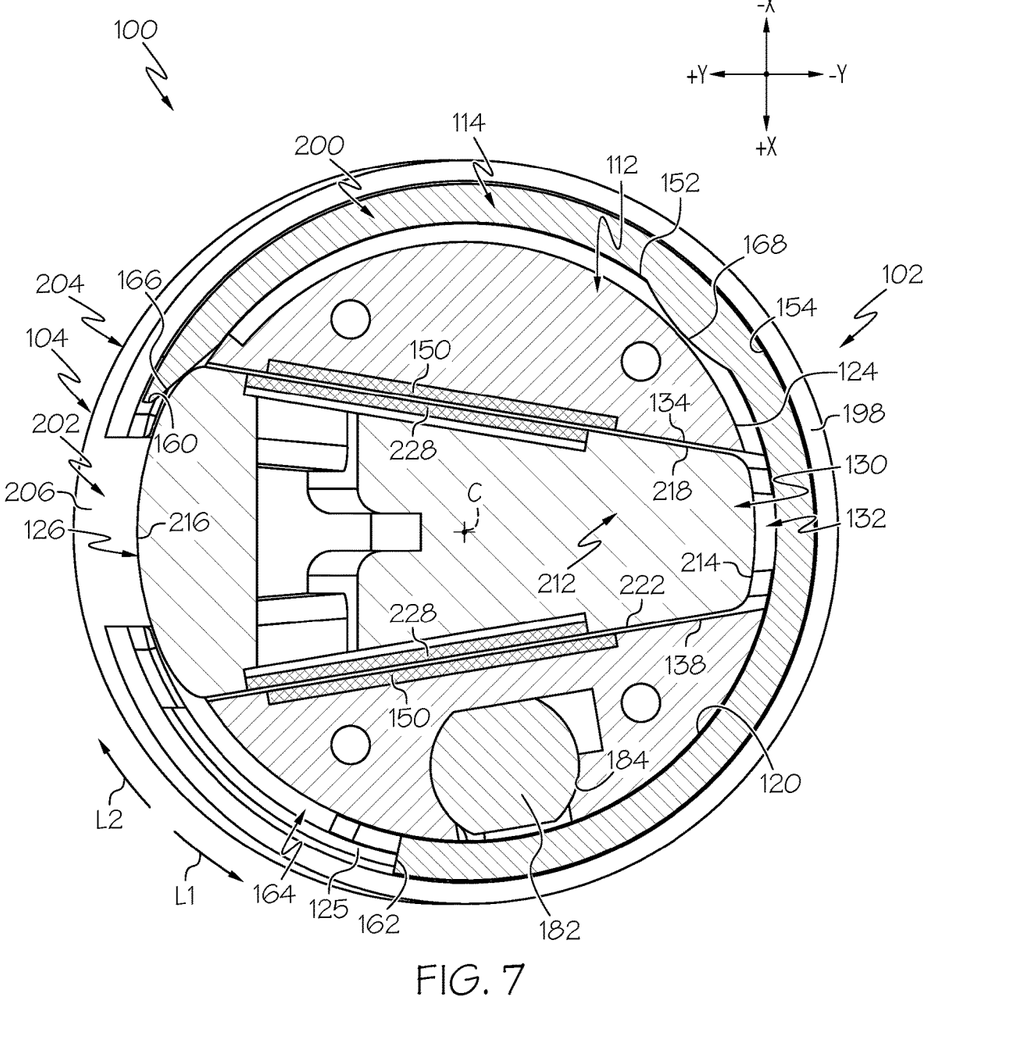
FIG. 7 schematically depicts a cross-sectional top view of the tool adapter and the tool element in a partially engaged position and the unlocked state, according to one or more embodiments shown and described herein.

As shown in FIG. 7, with the tool element 104 still in the partially engaged position, the locking member 114 begins to rotate in the first direction L1 from the open position toward the closed position between the body 112 and the casing 198 of the tool adapter 102. The motor 182 causes the pinion gear 184 to rotate in the first direction G1, which engages the teeth 172 of the locking member 114. Thus, rotation of the pinion gear 184 in the first direction G1 causes the locking member 114 to move in the first direction L1 about the central rotation axis C. As the locking member 114 rotates in the first direction L1 the first edge 160 of the locking member 114 contacts a portion of the head 212 of the tool element 104. Specifically, the cam 166 formed on the inner surface 152 of the locking member 114 at the first edge 160 thereof contacts the rear end 216 of the head 212 of the tool element 104. Additionally, rotation of the locking member 114 in the first direction L1 rotates the dome 168 out of the front opening 132 of the body 112 and out of contact with the nose end 214 of the head 212 of the tool element 104. As the dome 168 moves out of the front opening 132 of the body 112 of the tool adapter 102, the dome 168 enters the indentation 124 formed in the side wall 120 of the body 112. Continued rotation of the locking member 114 in the first direction L1 causes the first edge 160 of the locking member 114 to push the tool element 104 further into the tool hole 130 of the tool adapter 102 and into the fully engaged position. As the locking member 114 rotates in the first direction L1 and toward the closed position, the opening 164 formed in the locking member 114 begins to move across the rear opening 126 of the body 112 of the tool adapter 102. Thus, the locking member 114 begins to close or conceal the rear opening 126 and prevent the tool element 104 from being removed from the tool adapter 102.

Figure 8:
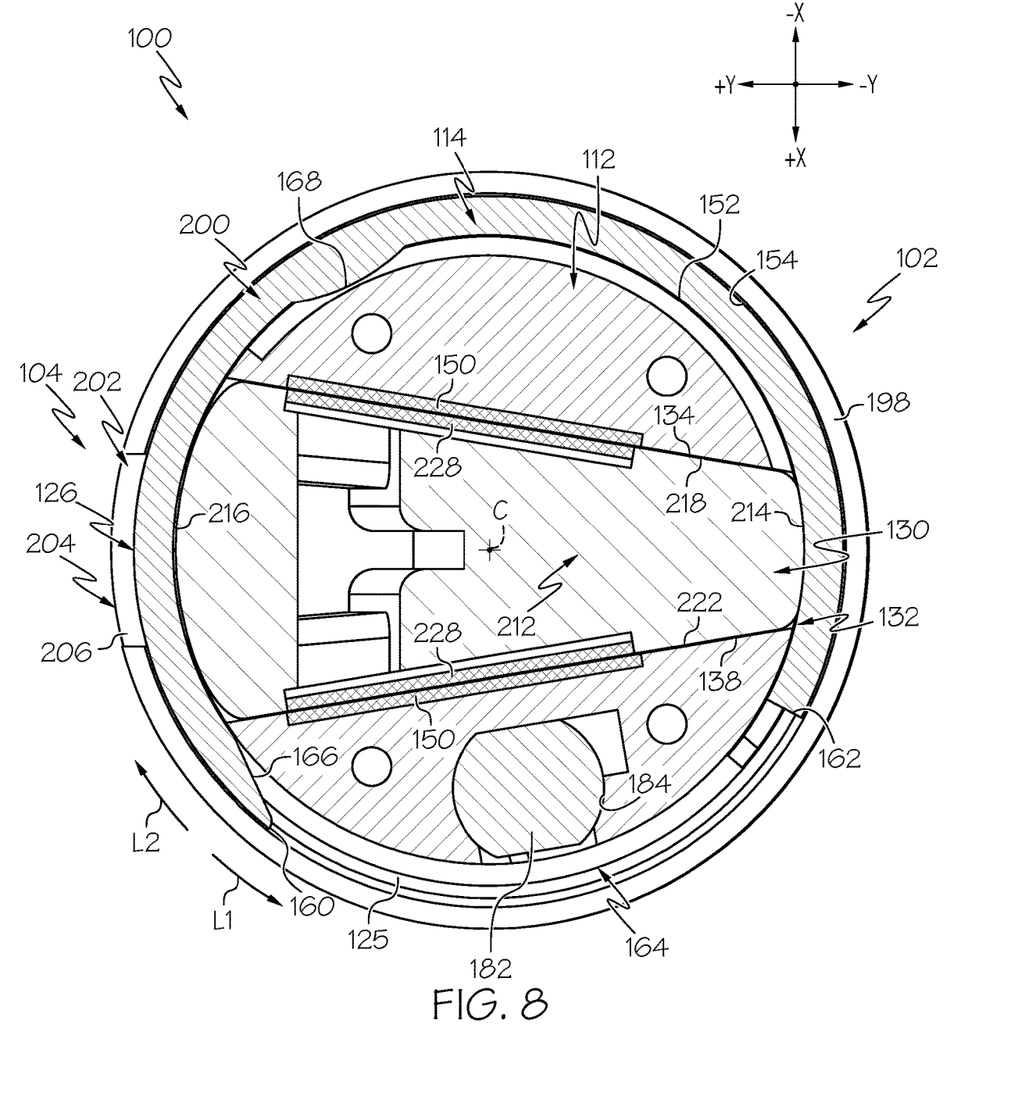
FIG. 8 schematically depicts a cross-sectional top view of the tool adapter and the tool element in a fully engaged position and the locked state taken along line 8-8 of FIG. 3, according to one or more embodiments shown and described herein.

As shown in FIG. 8, the locking member 114 is in the closed position such that the opening 164 formed therein does not overlap the rear opening 126 formed in the body 112 of the tool adapter 102. Instead, the locking member 114 completely closes or conceals the rear opening 126 of the body 112 to prevent the tool element 104 from being removed from the tool hole 130 of the tool adapter 102. As shown, once the locking member 114 is in the closed position, the tool element 104 is pushed into the fully engaged position by the inner surface 152 of the locking member 114 contacting the rear end 216 of the tool element 104. When in the fully engaged position, the electrical contacts 228 of the tool element 104 are aligned with the electrical contacts 150 of the tool adapter 102 such that power transfer and communication between the tool adapter 102 and the tool element 104 are permitted. When the locking member 114 is rotated into the locked position, the second nub 176 of the locking member 114 is rotated to contact the second switch 194 of the switch device 188, thereby deactivating the motor 182 and stopping rotation of the pinion gear 184 in the first direction G1. It should be appreciated that, when the tool adapter 102 is in the locked state with the locking member 114 in the closed position, the tool element 104 may not be removed from the tool adapter 102.

To remove the tool element 104 from the tool adapter 102, the above steps are performed in the reverse order, thereby rotating the locking member 114 toward the open position and permitting removal of the tool element 104. Particularly, to rotate the locking member 114 toward the open position, the motor 182 is operated to rotate the pinion gear 184 in the opposite second direction G2. In doing so, the pinion gear 184 engages the teeth 172 of the locking member 114 and causes the locking member 114 to rotate in the second direction L2. Rotation of the locking member 114 in the second direction L2 causes the opening 164 formed in the locking member 114 to rotate toward the rear opening 126 formed in the body 112 of the tool adapter 102 and overlap one another. Continued rotation of the locking member 114 in the second direction L2 rotates the dome 168 of the locking member 114 back into the front opening 132 of the body 112 of the tool adapter 102 to contact the nose end 214 of the tool element 104. As the dome 168 contacts the nose end 214 of the tool element 104, the tool element 104 is pushed in the opposite direction toward the rear opening 126, which is now uncovered by the locking member 114 in the open position. It should be appreciated that, in some embodiments, the width of the opening 164 of the locking member 114 may be greater than the width of the rear opening 126 of the body 112 of the tool adapter 102 so as to not obstruct movement of the tool element 104 when pushed toward the rear opening 126 by the dome 168. As such, the dome 168 facilitates partially ejecting the tool element 104 from the tool hole 130 of the tool adapter 102 to facilitate removal of the tool element 104 from the tool adapter 102. Once the locking member 114 is rotated into the open position and the tool adapter 102 is in the unlocked state, the first nub 174 contacts the first switch 190 of the switch device 188 to deactivate the motor 182 and, thus, rotation of the pinion gear 184 and the locking member 114.

From the above, it is to be appreciated that defined herein is a robotic tool changer for attaching various tools onto a robotic device such as, for example, a robotic arm. The robotic tool changer includes a tool adapter mounted to the robotic device and a tool element mounted to a tool. The tool element may be received within the tool adapter when a locking element of the tool adapter is in an open position and, thus, the tool adapter is in an unlocked state. Once the tool element is positioned within the tool adapter, the locking member may be positioned into a closed position, thereby positioning the tool adapter into a locked state and preventing removal of the tool element from the tool adapter. The geometry of the rear opening in the tool adapter corresponding to the geometry of the tool element provides a reduced risk of engagement failure between the tool adapter and the tool element. Additionally, the locking member facilitates engagement and disengagement of the tool element within the tool adapter as the locking member rotates between the open position and the closed position.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A tool adapter comprising:
   a body having a robot wall, a tool wall, and a side wall extending from the robot wall to the tool wall, a rear opening is formed in the side wall and the tool wall through which a tool element extends to enter a tool hole formed in the body; and
   a locking member rotatably movable about a central axis relative to the body between an open position in which the locking member permits positioning of the tool element into or out of the tool hole through the rear opening, and a closed position in which the locking member prohibits positioning of the tool element into or out of the tool hole through the rear opening.

2. The tool adapter of claim 1, wherein the locking member has a first edge and a second edge defining an opening, the opening of the locking member overlapping the rear opening of the side wall of the body when the locking member is in the open position, the locking member covering the rear opening of the side wall of the body when the locking member is in the closed position.

3. The tool adapter of claim 2, further comprising:
   a motor;
   a pinion gear rotatably fixed to the body and in communication with the motor; and
   a plurality of teeth provided on an inner surface of the locking member, the plurality of teeth and configured to engage the pinion gear, wherein:
   a first operation of the motor is configured to rotate the pinion gear in a first direction and cause the locking member to rotate toward the open position, and
   a second operation of the motor is configured to rotate the pinion gear in an opposite second direction and cause the locking member to rotate toward the closed position.

4. The tool adapter of claim 2, wherein the first edge of the locking member has a tapered surface configured to contact the tool element when moving toward the closed position and cause the tool element to move toward a fully engaged position within the tool hole of the body.

5. The tool adapter of claim 2, wherein the locking member has a dome extending radially inwardly toward the tool hole of the body and configured to eject the tool element from the tool adapter as the locking member moves from the closed position toward the open position.

6. The tool adapter of claim 1, wherein the body has a first interior wall, a second interior wall, and a third interior wall defining the tool hole which receives a head of the tool element when inserted into the body, the first interior wall, the second interior wall, and the third interior wall each including at least one electrical contact.

7. The tool adapter of claim 6, wherein the tool hole has a pyramidal shape.

8. A robotic tool changer comprising:
   a tool adapter comprising:
      a body having a robot wall, a tool wall, and a side wall extending from the robot wall and the tool wall, a rear opening is formed in the side wall and the tool wall; and
      a locking member movable relative to the body between an open position and a closed position; and
   a tool element comprising:
      a base attachable to a tool; and
      a head coupled to the base, wherein:
   the head of the tool element is insertable through the rear opening of the body of the tool adapter and into a tool hole of the tool adapter;
   when the locking member is in the open position, positioning of the head of the tool element through the rear opening of the body is permitted; and
   when the locking member is in the closed position, positioning of the head of the tool element through the rear opening of the body is not permitted.

9. The robotic tool changer of claim 8, wherein:
   the body has a first interior wall, a second interior wall, and a third interior wall defining the tool hole, the first interior wall, the second interior wall, and the third interior wall each includes at least one electrical contact; and
   the head of the tool element has a first side surface, a second side surface, and a third side surface each including at least one electrical contact configured to engage the electrical contacts of the body when the tool element is in a fully engaged position within the tool hole of the body.

10. The robotic tool changer of claim 9, wherein the tool hole of the tool adapter and the head of the tool element each have a pyramidal shape.

11. The robotic tool changer of claim 8, wherein the locking member has a first edge and a second edge defining an opening formed in the locking member, the opening of the locking member overlapping the rear opening of the body when the locking member is in the open position, the locking member covering the rear opening of the body when the locking member is in the closed position.

12. The robotic tool changer of claim 11, wherein the first edge of the locking member has a tapered surface configured to contact the tool element when moving toward the closed position and cause the tool element to be move toward a fully engaged position within the tool hole of the body.

13. The robotic tool changer of claim 8, further comprising:
a motor;
a pinion gear rotatably fixed to the body of the tool adapter and in communication with the motor; and
a plurality of teeth provided on an inner surface of the locking member and configured to engage the pinion gear, wherein:
a first operation of the motor is configured to rotate the pinion gear in a first direction and cause the locking member to rotate toward the open position; and
a second operation of the motor is configured to rotate the pinion gear in an opposite second direction and cause the locking member to rotate toward the closed position.

14. The robotic tool changer of claim 8, wherein the locking member has a dome extending radially inwardly into the tool hole of the body and configured to eject the tool element from the tool adapter as the locking member moves from the closed position toward the open position.

15. A method comprising:
rotating a locking member of a tool adapter coupled to a robotic arm in a first direction from a closed position to an open position to provide access to a tool hole of the tool adapter through a rear opening of the tool adapter;
inserting a tool element coupled to a tool through the rear opening of the tool adapter and into the tool hole of the tool adapter; and
rotating the locking member in an opposite second direction from the open position toward the closed position to prevent removal of the tool element out of the tool hole of the tool adapter through the rear opening.

16. The method of claim 15, further comprising:
controlling a motor to rotate a pinion gear in first direction and an opposite second direction; and
engaging, by the pinion gear, a plurality of teeth on an inner surface of the locking member to rotate the locking member toward the closed position when the pinion gear is rotated in the first direction, and toward the open position when the pinion gear is rotated in the second direction.

17. The method of claim 15, further comprising:
inserting the tool element into the tool hole of the tool adapter through the rear opening of the tool adapter such that the tool element contacts a dome on an inner surface of the locking member and extending into the tool hole of the tool adapter; and
preventing the tool element from moving into a fully engaged position within the tool hole of the tool adapter when the locking member is in the open position and the tool element contacts the dome of the locking member.

18. The method of claim 17, further comprising:
rotating the locking member from the open position toward the closed position such that the dome of the locking member moves out of contact with the tool element;
contacting the tool element with a first edge of the locking member as the locking member rotates from the open position toward the closed position; and
causing the tool element to move toward the fully engaged position within the tool hole of the tool adapter as the locking member moves toward the closed position and the first edge of the locking member contacts the tool element.

19. The method of claim 15, further comprising detecting a misalignment between the tool element and the tool adapter as the tool element is inserted into the tool hole of the tool adapter through the rear opening.

20. The method of claim 19, further comprising automatically adjusting a position of at least one of the tool adapter and the tool element to correct the misalignment between the tool element and the tool adapter.

* * * * *